United States Patent [19]

Takahashi et al.

[11] 4,003,022

[45] Jan. 11, 1977

[54] SYMBOL STRING PATTERN RECOGNITION EQUIPMENT

[75] Inventors: Kousuke Takahashi; Haruki Kohara, both of Tokyo, Japan

[73] Assignee: Nippon Electric Co., Ltd., Tokyo, Japan

[22] Filed: July 24, 1975

[21] Appl. No.: 598,958

[30] Foreign Application Priority Data

| Aug. 2, 1974 | Japan | 49-89278 |
| Nov. 25, 1974 | Japan | 49-135716 |
| Dec. 23, 1974 | Japan | 49-2463 |

[52] U.S. Cl. .................. 340/146.3 MA; 328/75; 328/92; 340/146.3 J; 340/146.3 WD
[51] Int. Cl.² .......................................... G06K 9/00
[58] Field of Search ....... 340/146.3 AC, 146.3 AQ, 340/146.3 H, 146.3 C, 146.3 J, 146.3 F, 146.3 MA, 174 TF; 307/203, 209, 210, 213; 328/92, 97, 75; 235/152

[56] References Cited

UNITED STATES PATENTS

| 3,140,466 | 7/1964 | Greanias et al. | 340/146.3 AC |
| 3,619,583 | 11/1971 | Arnold | 328/92 |
| 3,714,630 | 1/1973 | Cribbs | 340/146.3 J |
| 3,760,356 | 9/1973 | Srivastava | 340/146.3 Y |
| 3,786,428 | 1/1974 | Takahashi | 340/146.3 AQ |
| 3,808,544 | 4/1974 | Walker | 328/92 |
| 3,878,509 | 4/1975 | Kikuchi et al. | 340/146.3 MA |
| 3,912,914 | 10/1975 | Moylan | 328/92 |

Primary Examiner—Leo H. Boudreau
Attorney, Agent, or Firm—Sughrue, Rothwell, Mion, Zinn & Macpeak

[57] ABSTRACT

A symbol string pattern recognition equipment for use in a pattern data processing system employs sequential logics to perform simultaneous comparison of respective symbol string patterns and standard symbol patterns. The equipment includes an external signal generating circuit for generating respective symbols constituting a symbol string pattern in the form of a string of binary-coded external signals. At least one internal signal generating circuit generates an internal signal upon initiation of the supply of the symbol string pattern. A plurality of sequential logic circuits are connected to the internal signal generating circuit and control the travelling paths of the internal signal. A gate circuit is connected between each of the sequential logic circuits and adapted to be turned on upon completion of the supply of the symbol string pattern. An external shift register is connected to the gate circuit, and a circuit for detecting the internal signal is connected to the external shift register.

4 Claims, 14 Drawing Figures

| NO. | SYMBOL | $t_1$ $t_2$ $t_3$ $t_4$ | $S_{i1}$ $S_{i2}$ $S_{i3}$ $S_{i4}$ (i=0,1,2) |
|---|---|---|---|
| 1 | $\bar{A}$ | T C C C | 1 0 0 0 |
| 2 | $\bar{B}$ | C T C C | 0 1 0 0 |
| 3 | $\bar{C}$ | C C T C | 0 0 1 0 |
| 4 | $\bar{D}$ | C C C T | 0 0 0 1 |

FIG.IIA

FIG.IIB

SYMBOL STRING PATTERN RECOGNITION EQUIPMENT

BACKGROUND OF THE INVENTION

1. Field of the Invention

This invention relates to a symbol string pattern recognition equipment for use in a pattern data processing system.

2. Description of the Prior Art

The recognition equipment is such that, in an input pattern recognition system, in which the class of an input pattern is determined by the relative arrangement of features, it receives each input pattern as a symbol string pattern, discriminates its class by the comparison with standard symbol string patterns based on the sequential logics, and thus it is indispensable to the recognition of hand-written characters.

As can be seen from the article entitled "NEC Automatic Mail Processing System", disclosed in the periodical NEC RESEARCH & DEVELOPMENT NO. 20 published in January, 1971, on Pages 100 to 109, the symbol string recognition equipment proposed hitherto are developed in the form of a special-purpose digital computer, in which a plurality of standard symbol string patterns are stored in a magnetic core memory. In this case, the number of the standard symbol string patterns required for obtaining a specific recognition ratio amounts to as many as several hundreds even in the case of the recognition of only 10 characters. The sequential comparison of a symbol string pattern from each input pattern with the standard symbol string patterns stored in the core memory continues, until the determination of the class for the input pattern has been given. As a result, the recognition processing time per input pattern depends on the product of the number of the standard symbol string patterns multiplied by the access time for reading out the respective standard symbol string patterns from the core memory, resulting in a considerably long time period needed for processing. As is apparent from the foregoing, the costly high speed core memory must be employed only for the purpose of recognizing the input patterns at not so high processing speed. Thus, the symbol string pattern recognition equipment in the prior art has several vital disadvantages in that the equipment must select one of the three possibilities, i.e., (i) adoption of a higher speed (and hence, further costly) core memory to cope with an increase in the number of characters to be recognized, (ii) compromise with the lowering in the processing speed and (iii) admission of the low recognition ratio.

SUMMARY OF THE INVENTION

It is one object of the present invention to provide a novel symbol string pattern recognition equipment free from the abovementioned symbol string pattern recognition equipment in the prior art.

It is another object of the present invention to provide a symbol string pattern recognition equipment using a circulating-type access memory with a high storage density, in place of a random access memory to present a more economical recognition equipment.

It is a further object of the present invention to provide a symbol string pattern recognition equipment performing simultaneous comparison according to the sequential logics of symbol string pattern and whole standard symbol patterns to enable a high processing speed, irrespective of an increase in the number of characters to be recognized.

It is a still further object of the present invention to provide a symbol string pattern recognition equipment directly embodying the sequence logic processing function for the symbol string patterns in the form of hardware through a state transition diagram of the sequential logics not through the medium of flow charts or decision tables.

It is a yet further object of the present invention to provide a symbol string pattern recognition equipment effectively utilizing a magnetic bubble device for the sequence logic processing of symbol string patterns.

It is another object of the present invention to provide a symbol string pattern recognition equipment presenting a more compact Optical Character Recognition Equipment as a means of man-machine interaction adapted to easier use by many users.

These objects may be readily attained in a symbol string pattern recognition equipment according to the present invention, which comprises: an external signal generating circuit for generating respective symbols constituting a symbol string pattern in the form of a string of binary-coded external signals; at least one internal signal generating circuit for generating an internal signal upon initiation of the supply of the symbol string pattern; a plurality of sequential logic circuits connected to the internal signal generating circuit and controlling travelling paths of the internal signal; a gate circuit connected to each of the sequential logic circuits and adapted to be turned on upon completion of the supply of the symbol string pattern; an external shift register connected to the gate circuit; a circuit for detecting the internal signal and connected to the external shift register; a plurality of internal shift registers arranged in the form of a chain in each sequential logic circuit and each circulating said internal signal in synchronism with the external signals or moving the internal signal up and down; and function-coupling elements which are included in the sequential logic circuits and shift said internal signal from an optional stage of a front internal shift register (on the side closer to the internal signal generating circuit) to some stage of a rear internal shift register (on the side closer to the gate circuit) or erase said internal signal midway or feed the same back, when one of the binary-coded external signals is received, and feed back the internal signal all the time, when the other of the binary-coded external signals is received.

BRIEF DESCRIPTION OF THE DRAWINGS

The present invention will now be described in greater detail in conjunction with the accompanying drawings, in which.

DESCRIPTION OF THE PREFERRED EMBODIMENT

Figure 1:
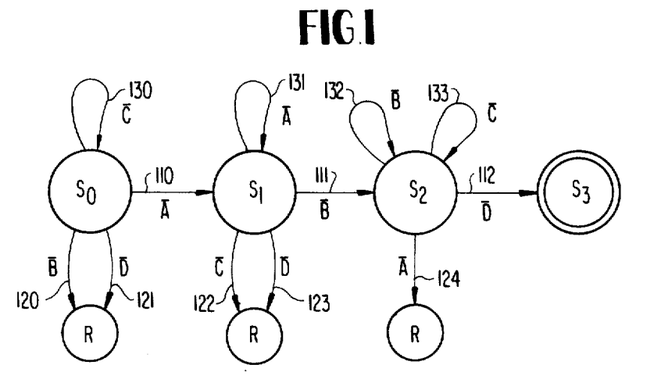
FIG. 1 shows a state transition diagram of a sequential logic.

Referring now to FIG. 1, a standard symbol string pattern $A\ B$ is accepted in a sequence, and an internal signal is set in an initial state node $S_0$ before a symbol string pattern is applied thereto. If a first symbol is $A$, the internal signal is introduced to a positive path 110 for proceeding to a next state node $S_1$. If the symbol is $\bar{B}$ or $\bar{D}$, the internal signal is fed into a negative path 120 or 121 for proceeding to respective rejection nodes R. When the symbol is $\bar{C}$, the symbol is led into a don't care path 130 for returning to the initial state node $S_0$. Also, in case where the second and third symbols are given, the operations similar to those mentioned above can be carried out in the state nodes wherein the internal signal is present. In this case, the symbol $\bar{D}$ is used as an end mark to be added to the ends of the respective symbol string patterns. Accordingly, the respective symbol string patterns may be discriminated depending on whether the internal signal may reach an end state node $S_3$ by way of output paths 110, 111 and 112 which are sequentially selected according to the string of symbols.

Figure 2:
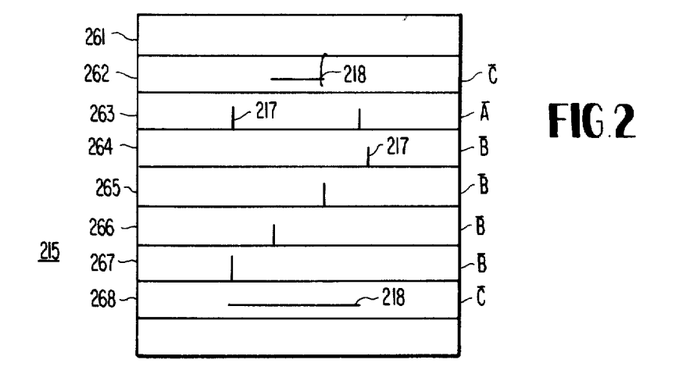
FIG. 2 shows a diagram illustrating one example wherein an input character is decomposed into a symbol string pattern.

For instance, in FIG. 2, a symbol string $\bar{A}\ \bar{B}\ \bar{D}$ or $\bar{C}\ \bar{A}\ \bar{B}\ \bar{D}$ is accepted and a symbol string $\bar{B}\ \bar{A}\ \bar{D}$ or $\bar{A}\ \bar{C}\ \bar{B}\ \bar{D}$ is rejected. The input symbols $\bar{A}$, $\bar{B}$, $\bar{C}$ and $\bar{D}$ correspond to the respective features extracted according to the feature extraction in a handwritten character recognition system or to the respective characters of alphabet forming each word in a word-recognition system. In a practical recognition system, several hundreds to several thousands of sequential logics as illustrated in FIG. 1 are employed to be adapted to varieties of input patterns and characters. The class for each symbol string pattern is determined by comparing it will all sequential logics and checking which sequential logic has accepted the pattern.

In FIG. 2, a hand-written FIG. 2 is decomposed into a symbol string pattern. A forming surface 215 of an input character is divided into a plurality of sections 261, 262 ... 267 and 268, so that the input character in the respective sections is normalized into elementary pieces, i.e., into either of longitudinal bars 217 and transverse bars 218. In accordance with the condition of the elementary pieces in the respective sections, for instance, if a symbol $\bar{C}$ is brought into correlation to a single transverse bar 218 in the second section 262, a symbol $\bar{A}$ is brought into correlation to two longitudinal bars 217 in the third section 263, and a symbol $\bar{B}$ is brought into correlation to a single longitudinal bar 217 in the fourth section 264, then the input character "2" is converted into a symbol string pattern $\bar{C}\ \bar{A}\ \bar{B}\ \bar{B}\ \bar{B}\ \bar{B}\ \bar{C}\ \bar{D}$. Also, a symbol $\bar{D}$ is added as an end mark.

A standard symbol string pattern is specified into a simple form by the sequential logic $\bar{A}\ \bar{B}\ \bar{D}$ as shown in FIG. 1 to the extent that a symbol string pattern converted from a standard input character in the similar manner will not be mixed up with that of the other classes.

A method for automatically preparing the sequential logics which are simple and match with intuition by using computer and software from the collection of a series of training symbol string patterns is disclosed in Pages 153 to 160 in the article entitled "COMPUTER-AIDED DESIGN FOR A READER OF HAND-PRINTED CHARACTERS" published in PROCEEDINGS OF THE IJCAI, 1969. However, the present invention is intended to perform the discrimination of the symbol string pattern based on the aforesaid sequential logic by directly embodying the state transition diagram of the sequential logics in the form of hardware.

Figure 3:
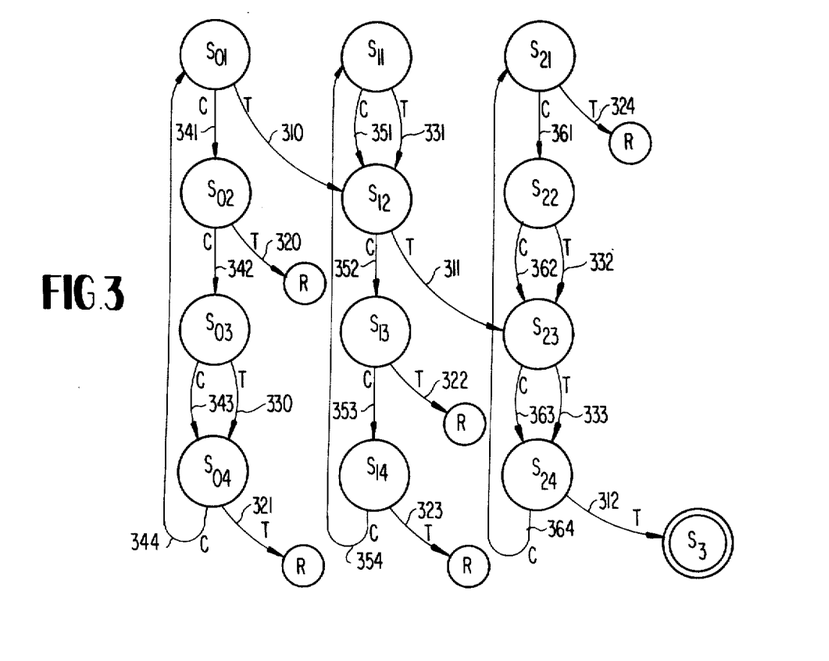
FIG. 3 shows a state transition diagram of a sequential logic in case where the respective input symbols are decomposed into binary-coded external signal strings.

In FIG. 3 which shows a state transition diagram of a sequential logic for the purpose of illustrating the principle of the present invention, the method of the sequential logic processing is identical to that of FIG. 1. However, in FIG. 3, the respective state nodes $S_i$ of FIG. 1 are decomposed into four substate nodes $S_{ij}$ ($i = 0, 1, 2, j = 1, 2, 3, 4$) except for an end state node $S_3$. In addition, the respective input symbols are converted into the binary external signal strings consisting of external signals T and C. This reduces the number of output paths along which an internal signal proceeds from each respective substate node $S_{ij}$ irrespective of the number of the kinds of the input symbols. That enables a sequential logic circuit directly simulating the state transition diagram of the sequential logic, which will be described in more detail by referring to FIGS. 3 and 4 hereunder.

Figure 4:
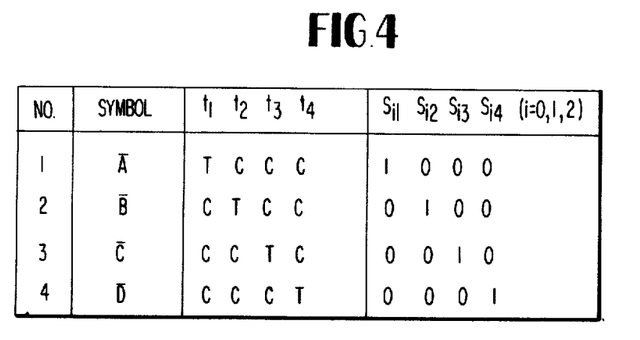
FIG. 4 shows a table illustrating the relationship among respective input symbols, binary-coded external signal strings and positions of an internal signal.

FIG. 4 shows the relationship among respective input signals, binary-coded external signal strings and positions of an internal signal in the state transition diagram of FIG. 3 at the time of generation of external signals in the respective external signal strings. Four input symbols $\bar{A}$, $\bar{B}$, $\bar{C}$ and $\bar{D}$ are represented due to the difference in the generating time of the external signals T in the four external signal strings consisting of T and C, while the external signal T is produced at the time $t_j$ in the external signal string corresponding to the $j$-th input symbol ($j = 1, 2, 3, 4$). Such an external signal string is referred to as "1 out-of 4 code". Also, an internal signal "1" is shifted in a manner to pass through the first substate node $S_{ii}$ ($i = 1, 2, 3$), then the second ($S_{i2}$), the third ($S_{i3}$) and fourth $S_{i4}$), and back to the intitial substate node $S_{ii}$, upon receipt of every input symbol. Accordingly, the internal signal "1" leaves the $S_{ij}$-th substate node at the time of generation of the external signal T in the external signal string, which corresponds to the $j$-th input symbol. As a result the output paths (positive paths 110, 111 and 112 or negative paths 120, 121, 122, 123 and 124, or don't care paths 130, 131, 132 and 133) selected by the $j$-th input symbol in the respective state nodes $S_{ij}$ in FIG. 1, may be substituted by output paths (positive paths 310, 311, and 312 or negative paths 320, 321, 322, 323 and 324 or don't care paths 330, 331, 332, and 333) selected by the external signal T in the $j$-th substate node $S_{ij}$ of FIG. 3. Also, in connection with this, return paths 341 to 344, 351 to 354 and 361 to 364 for returning the internal signal for every input symbol to the initial substate node $S_{ll}$ are used in FIG. 3. For instance, the symbol string pattern $\bar{A} \bar{B} \bar{D}$ is converted into the external signal strings represented by T C C C, C T C C, C C C T. For this reason, the internal signal first set in the initial substage node $S_{01}$ in a first column which is defined by the substate nodes $S_{01}$, $S_{02}$, $S_{03}$ and $S_{04}$ proceeds through the positive path 310 and the return paths 352, 353, and 354 to the initial substate node $S_{11}$ in a second column defined by the substate $S_{11}$, $S_{12}$, $S_{13}$ and $S_{14}$ by the external signal string T C C C, and then by way of the return paths 351 and the positive path 311 and the return paths 363, and 364 to the third initial state node $S_{21}$ by the external signal string C T C C and finally by way of the return paths 361, 362 and 363 and the positive path 312 to the end state node $S_3$ by the external signal string C C C T. In this manner, the symbol string $\bar{A} \bar{B} \bar{D}$ is accepted. As another example, a symbol string pattern $\bar{C} \bar{A} \bar{D}$ is converted into external signal strings represented by C C T C, T C C C, C C C T. In this case, the internal signal set in the initial substate node $S_{01}$ in the first column circulates through a link of the substate nodes in the first column through the return paths 341 and 342, the don't care path 330 and the return path 344 by the first external signal string C C T C, proceeds from the node $S_{01}$ through the positive path 310 and the return paths 352, 353, and 354 to the second substate node $S_{11}$ by the second external signal string T C C C, and then from $S_{11}$ by way of the return paths 351, 352 and 353 and the negative path 323 to the rejection node R by the last external signal string C C C T. In this way, the symbol pattern $\bar{C} \bar{A} \bar{D}$ is rejected.

Figure 5A:
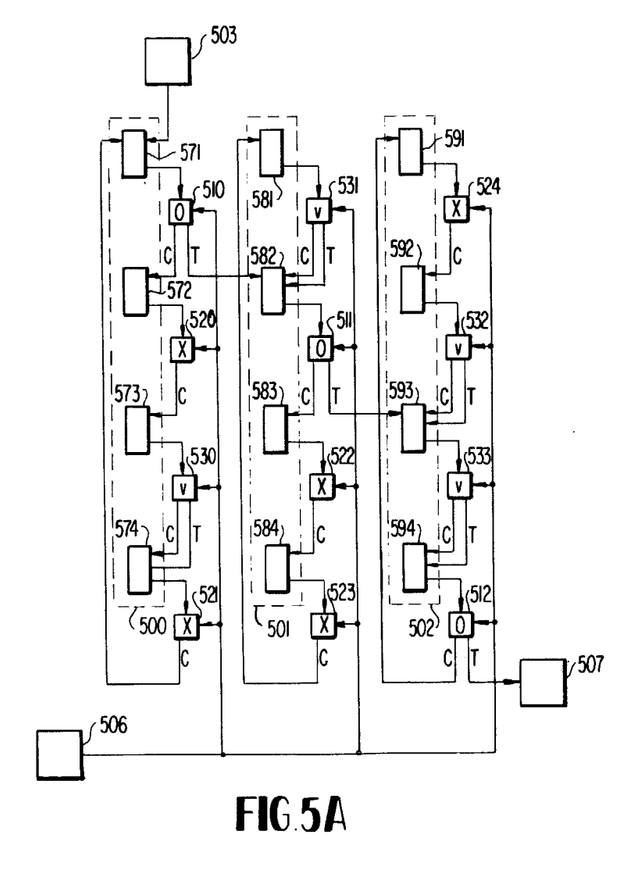
FIG. 5A shows a schematic diagram of the structure of the present invention.

In FIG. 5A which shows a schematic diagram for illustrating the outline of the first embodiment of the present invention, the most fundamental sequential logic circuit is illustrated. Storage elements 571 to 574, 581 to 584, and 591 to 594 are used for the respective substate nodes $S_{01}$ to $S_{04}$, $S_{11}$ to $S_{14}$ and $S_{21}$ to $S_{24}$ of FIG. 3. Internal shift registers 500, 501 and 502 are formed of those storage elements. Connected to the upper stage of the internal shift register 500 at the left hand portion is an internal signal generating circuit 503. The circuit 503 produces an internal signal pulse, upon initiation of the supply of a symbol string pattern. Positive coupling elements 510 to 512 corresponding to the positive paths 311 to 313 of FIG. 3, negative coupling elements 520 to 524 corresponding to the negative paths 320 to 324, and don't care coupling elements 530 and 533 corresponding to the don't care paths 330 to 333, repectively are disposed between the stages of the registers 500, 501 and 502 in FIG. 5A. The strings of the external signals T and C shown in the table of FIG. 4 is applied to the coupling elements 510 to 512, 520 to 524 and 530 to 533 for each symbol from an external signal string generating circuit 506. One of the positive coupling elements 510 to 512 such as 510 shifts the internal signal pulse from the storage element 571 of the internal shift register 500 to the storage element 582 of the internal shift register 501, when the external signal T is given. One of the negative coupling elements 520 to 524 such as 522 keeps in its position or erases the internal signal pulse from the storage element 583 of the register 501. One of the don't care coupling elements 530 to 533 such as 532 transfers the internal signal pulse from the storage element 592 of the register 502 to the storage element 593 in the same register 502. If the external signal C is supplied in place of the external signal T, all the coupling elements 510 to 512, 520 to 524, and 530 to 533 circulate the internal signal pulse in the same internal shift register.

In short, the external signal C functions as a shift clock pulse for the respecticve internal shift registers. In addition, the external signal T serves as a shift clock pulse and functions so as to purge out the internal signal pulse from the respective internal shift registers. If such external signals C and T are applied in turn, the internal signal pulse travels, circulating in the registers 500, 501 and 502 as shown in FIG. 5A. The acceptance of a symbol string pattern by the sequential logic circuit depends on whether or not the internal signal pulse produced from the internal signal generating circuit 503 at the begining of supply of the symbol string pattern reaches a detecting circuit 507, upon completion of the supply of the symbol string pattern.

Figure 5B:
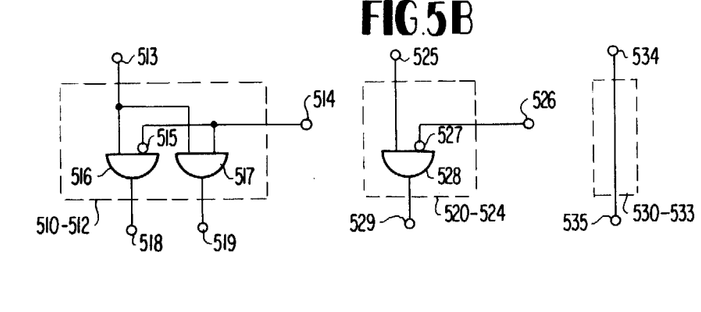
FIG. 5B shows diagrams of each coupling element used in FIG. 5A.

In FIG. 5B which shows diagrams of the arrangements of the respective coupling elements used in FIG. 5A, at the lefthand portion thereof, the positive coupling elements 510 to 512, an internal signal pulse given from an input terminal 513, if the external signal given from aother input terminal is "0", advances to an output terminal of an AND gate circuit 516, while the internal signal pulse proceeds to an output terminal 519 of an AND gate circuit 517, in case where the external signal is "1" (T). At the central portion of FIG. 5B, the negative coupling elements 520 to 524 are shown wherein the internal signal pulse from an input terminal 525, if an external signal supplied from another input terminal 526 is "0" (C), is led to an output terminal 529 of an AND gate circuit 528. On the other hand, if the external signal is "1" (T), the internal signal pulse is not produced. At the righthand end portion of FIG. 5B, the don't care coupling elements 530 to 533 are shown wherein an input terminal 534 for an internal signal pulse is directly connected to an output terminal 535, thus avoiding the influence due to the external signal. Also, the mark "O" referenced by numerals 515 and 527 attached to the input terminals of the AND gate circuits 516 and 528 denote the NOT function.

Figure 6:
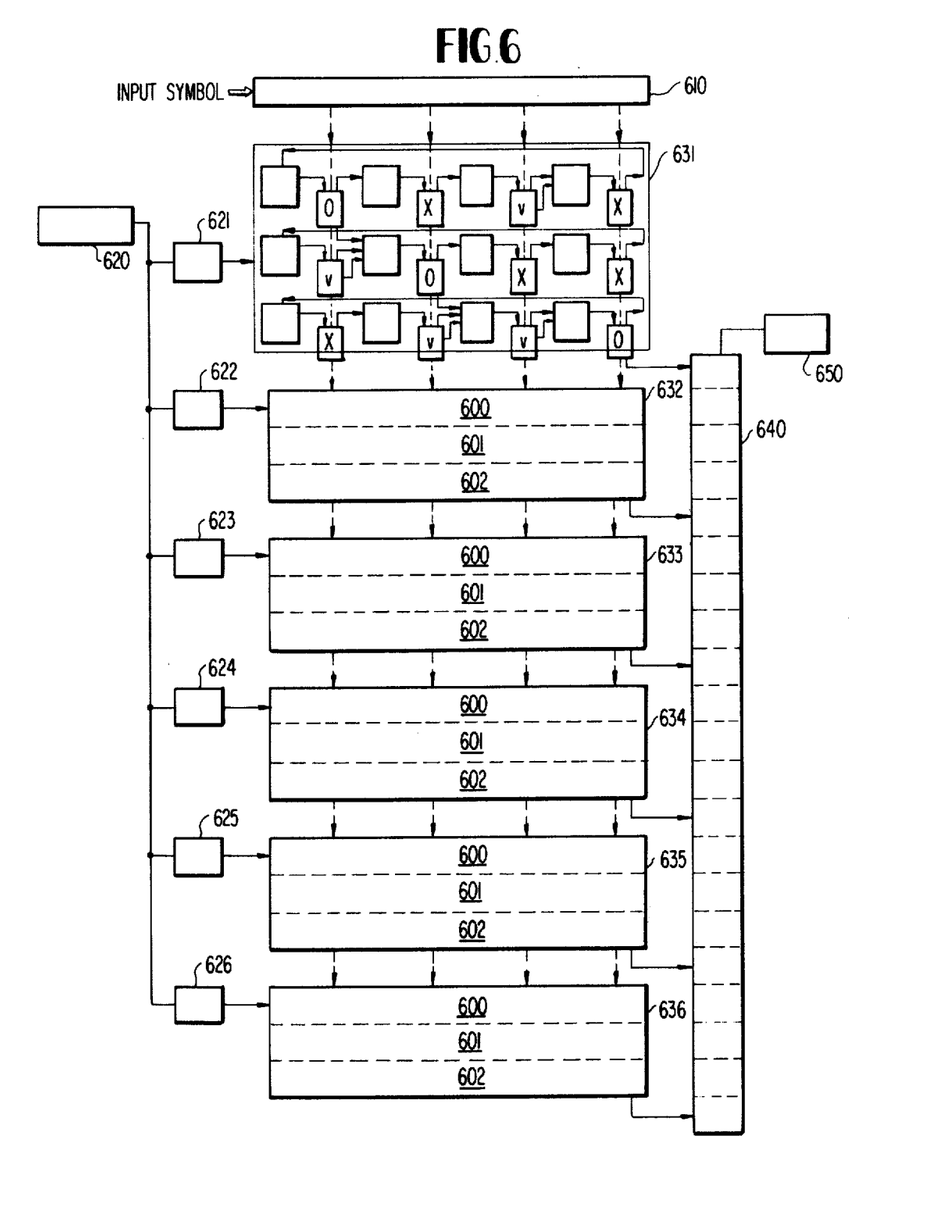
FIG. 6 shows a diagram of the arrangement of the first embodiment of the present invention.

In Fig. 6 which shows a diagram of the arrangement of the first embodiment of the invention, an external signal generating circuit 610 generates for respective symbols fed sequentially as inputs, strings of external signals T and C of "one out of 4 code", and the circuit 610 is connected to all the sequential logic circuits 631 to 636 consisting of six sequential logic circuits as shown in FIG. 5A. In contrast, a timing control circuit 620 adapted to operate so as to generate internal signal pulses, simultaneously, upon starting of supply of a symbol string pattern is connected to the left ends of internal signal generating circuits 621 to 626 connected to the left ends of the respective sequential logic circuits 631 to 636. Also, an external shift register 640 is connected to the right ends of the respective sequential logic circuits. When a symbol for an end mark attached to the last one of the symbol string pattern is given to the circuits 631 to 636 and 640, the internal signal pulses in an internal shift register 602 at the lower ends of the respective logic circuits 631 to 636 are transferred to the external shift register 640, simultaneously. The contents of the register 640 is fed out to a detecting circuit 650 by means of a shift clock given from the circuit 610, and then utilized in the exterior as class determining information, sequentially.

The first embodiment of the present invention described so far is realized by means of almost all the known memory devices capable of being utilized as a shift register such as a semi-conductor LSI, a CCD (charge coupled device) or a magnetic bubble device. However, if the magnetic bubble device, which is capable of being manufactured with less bit unit-cost because of higher packing density is used in this embodiment, it makes the realization of this embodiment easier since the internal signal pulses are moved up and down within the internal shift registers.

Figure 7:
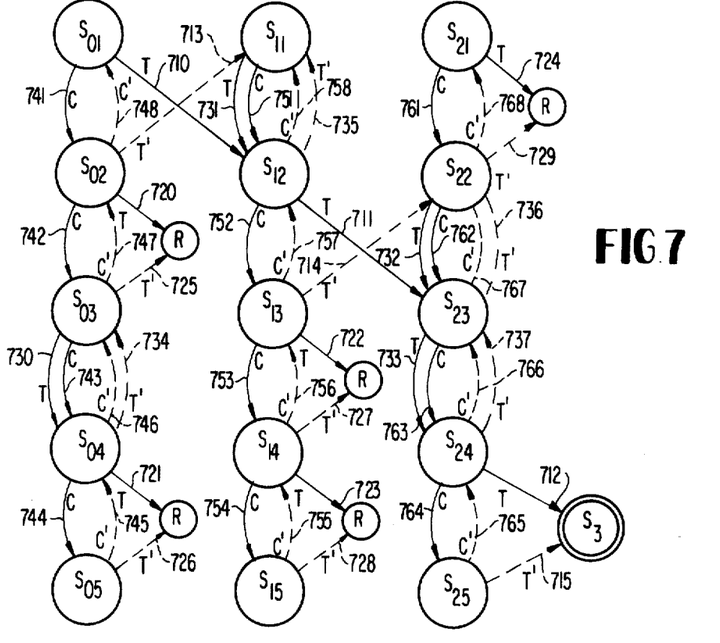
FIG. 7 shows a state transition diagram of a sequential logic in case of feeding the internal signal of FIG. 3 up and down.

In FIG. 7, an internal signal is travelled up and down within the internal shift register. The method of the sequential logic processing is the same as that of FIG. 1. However, in FIG. 7, the respective state nodes $S_i$ ($i = 0, 1, 2$) of FIG. 1 are decomposed into five substate nodes $S_{ij}$ ($i = 0, 1, 2, j = 1, 2, 3, 4, 5$). In addition, signals T and C same as those of FIG. 3 are used as external signals to cause an internal signal to move downward by one step, while external signals T' and C' are used as external signals to cause the internal signal to move upward by one step. As a result, two kinds of positive paths 710 to 712 and 713 to 715 of FIG. 7 correspond to the positive paths 310 to 312 of FIG. 3, negative paths 720 to 724 and 725 to 729 of FIG. 7 correspond to the negative paths 320 to 324, and don't care paths 730 to 733 and 734 to 737 of FIG. 7 correspond to the don't care paths 330 to 333 of FIG. 3.

Thus, if the internal signal is shifted upward or downward by one step, the lengths of the external signal strings corresponding to the respective input symbols may be further shortened. More particularly, the external signal C following the external signal T within the external signal strings corresponding to the respective symbols in FIG. 3 is simply used for returning the internal signal to the initial substate node $S_{ij}$. Thus, if the external signal C after the application of the external signal T is omitted, the positions of the internal signal after the completion of application of the respective symbols will be in the substate nodes other than the initial substate node $S_{ij}$. Therefore, if the presence of the internal signal in the above-mentioned position is stored, the internal signal may be started from the position when a new symbol is fed thereto. In this respect, referring to FIG. 4, the external signal T in the external signal string corresponding to each symbol is supplied, when the internal signal shifts over a span corresponding to the associated symbol. Accordingly, if the symbols are marked with letters such as by using $j$, the $j$-th symbol may be represented as external signals C or C' and T or T' supplied so as to lead an internal signal in a voluntary substate to an output path between the $j$th substate node $S_{ij}$ in the respective columns and the $(j + 1)$-th substate node $S_{ij+1}(i = 0, 1, 2)$. For instance, it is assumed here that symbols $\bar{A}, \bar{B}, \bar{C}, \bar{D}$ are numbered 1, 2, 3, 4, respectively. For feeding the third symbol $\bar{C}$ under the state in which an internal signal is present in the initial substate node $S_{01}$, the external signal string CCT adapted to lead its internal signal to an output path (the don't care path 730) between the substate nodes $S_{03}$ and $S_{04}$ may be used as the external signals corresponding to the symbol $\bar{C}$. In order to supply second symbol $\bar{B}$, after the internal signal has proceeded to the substate node $S_{04}$, an external signal string C'T' which leads the internal signal to an output path (the negative path 725) between the substate nodes $S_{02}$ and $S_{03}$ may be used as the external signals corresponding to the symbol $\bar{B}$. Generally speaking, if the difference is positive, which is obtained by subtracting the number representing the position of the substate node in each column where the internal signal has existed previously from the number of symbol, a prime mark (') is not attached to the external signals C and T. On the other hand, if such a difference is negative, the prime mark (') is attached thereto. Thus, the external signals may be generated in the manner mentioned above by feeding the external signal T or T' subsequent to the external signal C or C' by cycles equal to the aforesaid difference. For instance, description will be given of a case where the symbol string pattern $\bar{C} \bar{A} A \bar{B} \bar{C} \bar{B} \bar{D}$ is supplied, assuming that the internal signal is set to the substate $S_{01}$ in the uppermost stage in the first column, upon starting of the application of the symbol string pattern. In this case, as can be seen from a conversion table in FIG. 4, the symbol string pattern, in the example of FIG. 3, is converted into external signal strings (consisting of 28 external signals) such as CCTC, TCCC, TCCC, CTCC, CCTC, CTCC and CCCT, while the symbol string pattern, in the example of FIG. 7, is converted into external signal strings (consisting of 14 external signals) such as CCT, C'C'T', T, T, T, C'T', and CCT. In the case of the latter external signals, the travelling paths of the internal signal in FIG. 7 will become as follows: $S_{01} \rightarrow S_{02} \rightarrow S_{03} \rightarrow S_{04} \rightarrow S_{03}$ $S_{02} \rightarrow S_{11} \rightarrow S_{12} \rightarrow S_{23} \rightarrow S_{24} \rightarrow S_{23} \rightarrow S_{22} \rightarrow S_{23}$ $S_{24} \rightarrow S_3$. As another example, if symbol strings $\bar{A} \bar{B} \bar{D}, \bar{A} \bar{B} \bar{B} \bar{C} \bar{A}$ and $\bar{C} \bar{A} \bar{B} \bar{A}$ are taken, they are converted into external signal strings TTCT, TTT'CT-C'C'T' and CCTC'C'T'CTC'T'. Accordingly, the travelling paths of the internal signal will become as follows: $S_{01} \rightarrow S_{12} \rightarrow S_{23} \rightarrow S_{24} \rightarrow S_3, S_{01} \rightarrow S_{12} \rightarrow S_{23}$ $S_{22} \rightarrow S_{23} \rightarrow S_{24} \rightarrow S_{23} \rightarrow S_{22} \rightarrow R$, and $S_{01} \rightarrow S_{02}$ $S_{03} \rightarrow S_{04} \rightarrow S_{03} \rightarrow S_{02} \rightarrow S_{11} \rightarrow S_{12} \rightarrow S_{23} \rightarrow S_{22}$ R.

The difference between the sequential logic of FIG. 3 and that of FIG. 7 resides in the average shift number of the internal signal per symbol. Assuming that the number of the input symbols is $q$, the $q$ steps are required for the former, while $(q + 2)/3$ steps are required for the latter, which greatly reduces the processing time.

Figure 8:
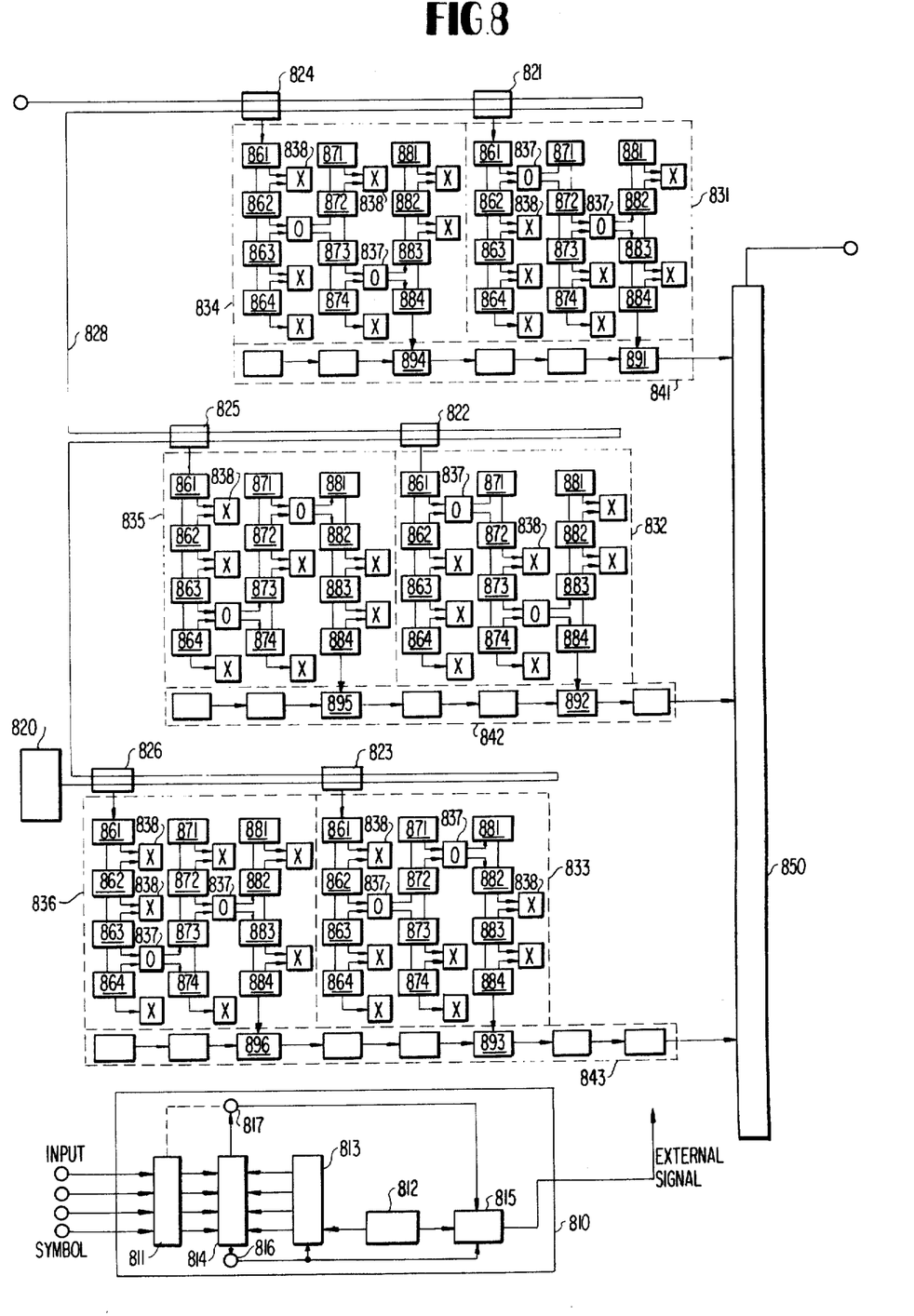
FIG. 8 shows diagram of the arrangement of the second embodiment of the present invention.

In FIG. 8 which shows a diagram of the arrangement of the second embodiment of the present invention, six sequential logic circuits 831 to 836 are connected through three external shift registers 841 to 843 to a detecting circuit 850. Internal signal pulse generators 821 to 826 at the upper ends of the circuits 831 to 836 deliver internal signal pulses simultaneously by way of a control current drive line 828 led from a timing control circuit 820, upon starting of supply of a symbol string pattern. An external signal generating circuit 810 converts an input symbol (binary code) fed into the register 811 into an external signal string consisting of T and C, and gives the external signal string to all the logic circuits 831 to 836. There are internal shift registers of three columns in the respective sequential logic circuits, while storage elements 861 to 864 are included in the first column, storage elements 871 to 874 in the second column, and storage elements 881 to 884 in the third column, respectively. Those storage elements correspond to the substate nodes $S_{01}$ to $S_{05}, S_{11}$ to $S_{15}$, and $S_{21}$ to $S_{25}$ in FIG. 7, respectively. In addition, a positive coupling element 837 and a negative coupling element 838 provided between the internal shift registers of FIG. 8 correspond to the positive paths 710 to 715 and the negative paths 720 to 729 of FIG. 7, respectively. However, don't care coupling elements are omitted here, since they do not assume the substantial form as shown in FIG. 5B. The logic circuit 831 is so designed as to receive $\bar{A} \bar{B} \bar{D}$ as the standard symbol string pattern, the logic circuit 832 receives $\bar{A} \bar{C} \bar{D}$, the logic circuit 833 does $\bar{B} \bar{A} \bar{D}$, the logic circuit 834 does $\bar{B} \bar{C} \bar{D}$, the logic circuit 835 does $\bar{C} \bar{A} \bar{D}$, and the circuit 836 does $\bar{C} \bar{B} \bar{D}$, respectively. For instance, the symbol string pattern $\bar{A} \bar{B} \bar{D}$ as described in FIG. 7 is converted into TTCT by the external signal generating circuit 810. As a result, in the circuit 831, the internal signal pulse given from the internal signal pulse generators 821 travel from the storage element 861 through two positive coupling elements 837 to the storage elements 883 and 884 and further to the storage element 891 in the external shift register 841. In the circuit 832, the internal signal pulse from the storage element 861 proceeds by way of the positive coupling element 837 to the storage element 872, to the negative coupling element 838 and disappears therein. Also, in the circuits 833 to 836, the internal signal pulse from the storage element 861 proceed directly to the negative coupling element 838 and disappear therein. In this manner, at the completion of supply of the symbol string pattern $\bar{A} \bar{B} \bar{D}$, the internal signal pulse reaches the storage element 891 in the external shift registers 841 to 843, and as a result, does not appear in other storage elements 892 to 896. The information in the registers 841 to 843 are fed from the external signal generating circuit 810 step by step to the detecting circuit 850 due to the succeeding external signals T or C. Since the number of steps from the storage elements 891 to 896 to the detecting circuit 850 is so designed as to vary by one step, the circuit 850 detects the contents of the storage element 891 in the external shift register 841 at the first step; the contents of the storage element 892 in the register 842 in the second step; the contents of the storage element 893 in the register 843 in the third step; the contents of the storage element 894 in the register 841 in the fourth step; and the contents of the storage elements 895 and 896 in the fifth and sixth steps, respectively; and finally, the circuit 850 produces class determining information as output. Consequently, the detecting circuit 850 gives 100000 for the symbol string $\bar{A} \bar{B} \bar{D}$, and determines it as the first class. The maximum step number of the internal signal pulse in external shift registers 841 to 843 is equal to the number, 6, of the sequential logic circuits 831 to 836. In comparison with FIG. 6, since the maximum step number is 21 in FIG. 6, the arrangement in FIG. 8 plays an important role in shortening the processing time.

Now, description will be given in more detail of the operation of the external signal generating circuit 810 shown in FIG. 8. An input symbol (binary code) is once set in a register 811. A comparator 814 immediately compares the contents of the register 811 with an output (binary code) of an up-down counter 813 representing the position of the internal signal pulse, and then gives a polarity pulse to an output terminal 816 on the lower side. As a result, the counting direction (up or down) of the counter 813 may be determined. The up-down counter 813 counts a clock pulse fed from a clock generator 812 depending on the counting direction. The comparator 814 generates a coincidence pulse from an output terminal 817 on the upper side, when the contents (binary code) of the counter 813 coincides with the contents (binary code) of the register 811. An external signal drive means 815 produces an external signal depending on the porality pulse and the coincidence pulse in synchronism with the clock pulse fed from the clock generator 812. For instance, the drive means 815 generates an external signal C in case where the porality pulse is "0" and the coincidence pulse is "0"; the means 815 generates an external signal T in case where the porality pulse is "0" and the coincidence pulse is "1"; the means 815 produces an external signal C' in case where the polarity pulse is "1" and the coincidence pulse is "0"; and the means 815 gives an external signal T' in case where the both pulses are "0", respectively. If the next input symbol is so designed as to be set in the register 811 at the time of generation of the coincidence pulse, the contents of the up-down counter 813 becomes equal to the number of the preceding input symbol. As a result, the clock number, until the comparator 814 gives the coincidence pulse, becomes equal to the difference between the number of the input symbol and the number of the position of the substate node. Thus, the generation of the external signal string described by referring to FIG. 7 becomes possible.

Figure 9:
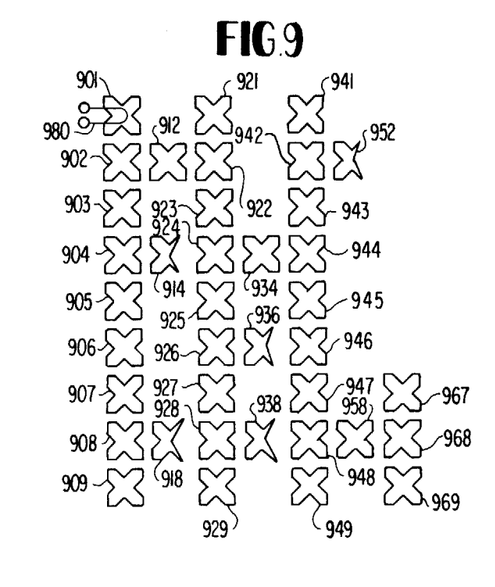
FIG. 9 shows a sequential logic circuit embodying a part of FIG. 8 by using a magnetic bubble device.

In FIG. 9, there is shown a sequential logic circuit consisting of a magnetic bubble device based on the arrangement of FIG. 7. Since the detailed nature and arrangement of the magnetic bubble device are described in an article "MAGNETIC BUBBLES" disclosed in Pages 78 to 90 in SCIENTIFIC AMERICAN (VOL. 224, No. 6) published in June, 1971, the detailed description thereof is omitted herein. However, the fundamental nature thereof will be enumerated hereunder briefly:

1. Magnetic bubbles (cylindrical magnetic domains) are formed in a magnetic sheet whose anisotropy of the magnetization is perpendicular to its sheet surface, and the magnetic bubbles of a diameter on the order of several micro meters are held in the sheet when a biasing magnetic field perpendicular to its sheet surface is supplied by suitable means such as permanent magnets and the like.

2. If the T-shaped and I-shaped or X-shaped or Y-shaped patterns and the like of a thin film of ferromagnetic and soft magnetic materials (such as permalloy) are arranged on the surface of the magnetic sheet and a rotating magnetic field parallel with the surface of the sheet is given, magnetic bubbles are attracted to the magnetic poles created on the patterns and may move with the movement of the poles. Also, if a conductor for supplying an electric current therethrough is provided on the sheet, the magnetic bubbles may be created or erased. In addition, by the use of a magnets-resistive element to which an electric current is supplied, whether or not the bubbles came close to the resistor element may be read as a variation in voltage in the resistor element.

3. Supply means for the rotating magnetic field and the biasing magnetic field may be used in common with a plurality of bubble chips. Assuming that the sizes of the respective bubble chips are all 5 × 5 mm, pemalloy thin film patters having around $10^5$ bits may be arranged thereon. Also, magnetic bubbles may be shifted in parallel on all the chips.

4. The fact that the suitable modulation of the rotating magnetic field enables two-dimensional shift of the magnetic bubbles by using the X-shaped permalloy thin film patterns, is disclosed in the U.S. Pat. No. 3,891,987 (Inventor: Haruki Kohara) assigned to the same assignee as the present application. In this, it is disclosed that the use of the magnetic bubbles as a memory device may further shorten the access time.

The application of the X-shaped permalloy thin film patterns capable of two-dimensionally shifting the magnetic bubbles in the magnetic bubble device with the above-mentioned characteristics to the sequential logic processing is shown in FIG. 9. The magnetic bubble corresponds to the internal signal, the modulation of the rotating magnetic field corresponds to the external signal string, X patterns 901, 903, 905, 907 and 909 to the respective substate nodes $S_{01}$, $S_{02}$, $S_{03}$, $S_{04}$, $S_{05}$ of FIG. 7, X patterns 921, 923, 925, 927 and 929 to the substate nodes $S_{11}$, $S_{12}$, $S_{13}$, $S_{14}$ and $S_{15}$, X patterns 941, 943, 945, 947 and 949 to the substate nodes $S_{21}$, $S_{22}$, $S_{23}$, $S_{24}$ and $S_{25}$, X patterns 967, 968, and 969 to the end state node $S_3$, respectively. In addition, X pattern 912, 934 and 958 are used as positive coupling elements; X patterns 194, 918, 936, 938 and 952 are used as negative coupling elements; and X patterns 906, 922, 944 and 946 are used as don't care coupling elements. A conductor 980 is used so as to set the bubbles in the center of the X pattern 901, upon starting of supply of a symbol string pattern.

Figure 10:
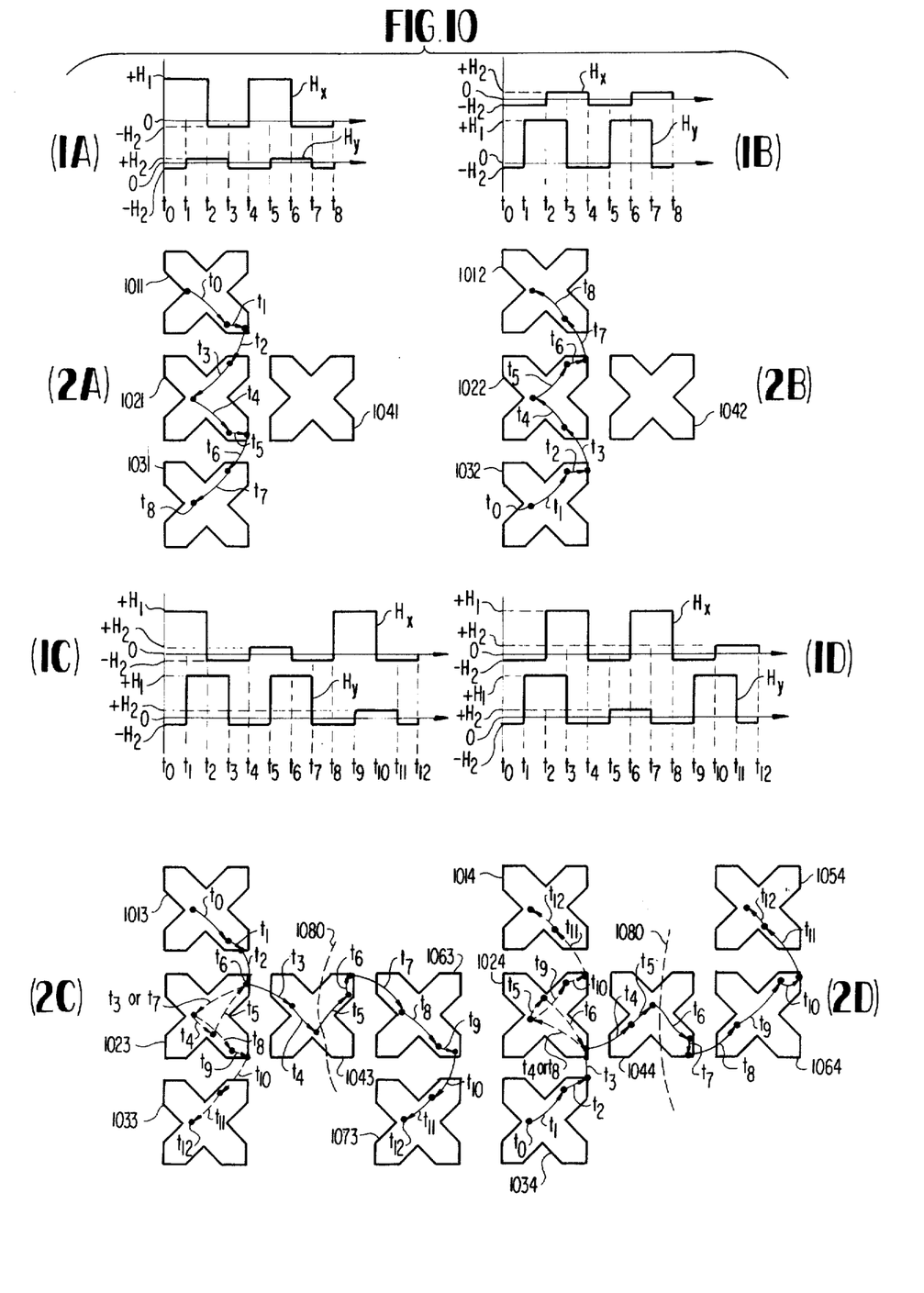
FIG. 10 illustrates how the drive magnetic fields are applied to the sequential logic circuit of FIG. 9.

In FIG. 10, there is shown explanatory views of drive magnetic fields for use in the X-shaped permalloy thin film patterns used in the logic circuit of FIG. 9. FIGS. 10 (1A), (1B), (1C) and (1D) represent the waveforms of the drive magnetic fields corresponding to the external signals C, C', T and T', while FIGS. 10 (2A), (2B), (2C) and (2D) represent the shifting paths of the magnetic bubbles according to the respective drive magnetic fields.

In FIGS. 10 (1A), (1B), (1C) and (1D), drive magnetic fields $H_x$ and $H_y$ assume amplitudes as shown in the respective drawings, and an amplitude $H_1$ takes a magnitude (20 Oe to 50 Oe) which is used for the ordinary propagation of the bubbles. An amplitude $H_2$ takes a magnitude (2 Oe to 10 Oe) of the order of ⅓ to 1/10 of $H_1$. The shift of the magnetic bubbles in the X-shaped permalloy thin film patterns are governed by the synthesized magnetic field of two drive magnetic fields $H_x$ and $H_y$. However, as described in the above-mentioned, U.S. No. 3,891,987, if either one of $H_x$ and $H_y$ is + $H_1$, and another is +$H_2$ or −$H_2$, the propagation of the bubble is governed by the drive magnetic field ($H_x$ or $H_y$) having the first amplitude $H_1$. However, the propagating direction of the bubbles, in case where the magnetic field varies from +$H_1$ to −$H_2$, is defined by the polarity of another drive magnetic field having the second amplitude $H_2$. Also, when both of drive magnetic fields $H_x$ and $H_y$ have the amplitude $H_2$, the bubbles are trapped in the neighborhood of the center of the X-shaped permalloy thin film pattern. For this reason, such actions as shown by arrows having $t_i$ at the respective times $t_i$ ($i$ = 0, 1, 2, . . . 12) at which the synthesized magnetic field of the drive magnetic fields $H_x$ and $H_y$ varies, are exerted on the magnetic bubbles on the X-shaped permalloy thin film patterns shown in FIGS. 10 (2A), (2B), (2C) and (2D) corresponding to the drive magnetic fields shown in FIGS. 10 (1A), (1B), (1C) and (1D).

Therefore, referring to FIG. 10 (2A), a magnetic bubble in an X-shaped permalloy thin film pattern 1011 proceeds through a pattern 1021 to a thin film pattern 1031 in the lowermost stage due to the drive magnetic field corresponding to the external signal C' shown in FIG. 10 (1A). Referring to FIG. 10 (2B), a magnetic bubble in a X-shaped permalloy thin film pattern 1032 in the lowermost stage advances through a pattern 1022 to a thin film pattern 1012 in the uppermost stage due to the drive magnetic field corresponding to the external signal C' shown in FIG. 10 (1C). In FIG. 10 (2C), a magnetic bubble in an X-shaped permalloy thin film pattern 1013 in the left uppermost stage goes by way of thin film patterns 1023, 1043, and 1063 to a thin film pattern 1073 in the right lowermost stage due to the drive magnetic field correspondiing to the external signal T shown in FIG. 10 (1C). Further referring to FIG. 10 (2D), a magnetic bubble in an X-shaped permalloy thin film pattern 1034 moves via thin film patterns 1024, 1044 and 1064 to a right uppermost thin film pattern 1054 due to the drive magnetic field corresponding to the external signal T' shown in FIG. 10 (1D). In this case, i the righthand parts of the thin film patterns 1043 and 1044 with reference to a broken line 1080 are omitted in order to use the X-shaped permalloy thin film patterns 1043 and 1044 shown in FIG. 10 (2C) and (2D) as the negative coupling elements, the magnetic bubbles fail to proceed to the thin film patterns 1063 and 1064, respectively, irrespectively of the supply of the drive magnetic fields in FIG. 10 (1C) or (1D). Also, by suitably determining the position of the broken line 1080, the bubbles in the thin film patterns 1043 and 1044 may be erased. In this case, even if they are not erased, the magnetic bubbles in the patterns 1043 and 1044 can not go to other thin film patterns such as 1013, 1023, 1024 and 1034, dispite the subsequent application of either of the drive magnetic fields shown in FIG. 10 (1A), (1B), (1C) and (1D). As a result, the bubbles residual in the thin film patterns 1043 and 1044 may be erased by increasing the biasing magnetic field after a suitable period of time. Also, in case where the X-shaped permalloy thin film patterns 1043 and 1044 as shown in FIG. 10 (2C) and (2D) are omitted so as to function as the don't care coupling elements, even if the drive magnetic fields in FIG. 10 (1C) and (1D) are applied, the magnetic bubbles will not proceed to the patterns 1043 and 1044 but to the thin film patterns 1023 and 1024, and then the bubbles shift to thin film patterns 1033 and 1014 according to the arrows of a broken line.

From the above-mentioned behavior of the magnetic bubbles in the X-shaped thin film patterns due to the drive magnetic fields corresponding to the external signals C, C', T and T', it is apparent that the behavior of the bubbles in the sequential logic circuit of FIG. 9 coincides with that of the internal signals corresponding to the respective external signals in the state transition diagram of FIG. 7. Accordingly, it is evident that the circuit as shown in FIG. 9 may be applied to the sequential logic circuit of FIG. 8. The function of the sequential logic processing may be achieved by suitably selecting the positions and number of the thin film patterns 912, 934 and 958 used as the positive coupling elements in FIG. 9 as well as by selecting the positions and number of the thin film patterns 914, 936, 938 and 952 used as the negative coupling elements. In this respect, the magnetic bubble which moves depending on the respective symbol string patterns imparted to the logic circuit of FIG. 9 is one in number per sequential logic circuit and the lowered operational margin stemmed from the repulsive action between the mutual bubbles is of no consequence. Therefore, it is quite easy to provide the density of permalloy thin film patterns of $10^5$ per 5 ×5 mm (size) chip.

Figure 11A:
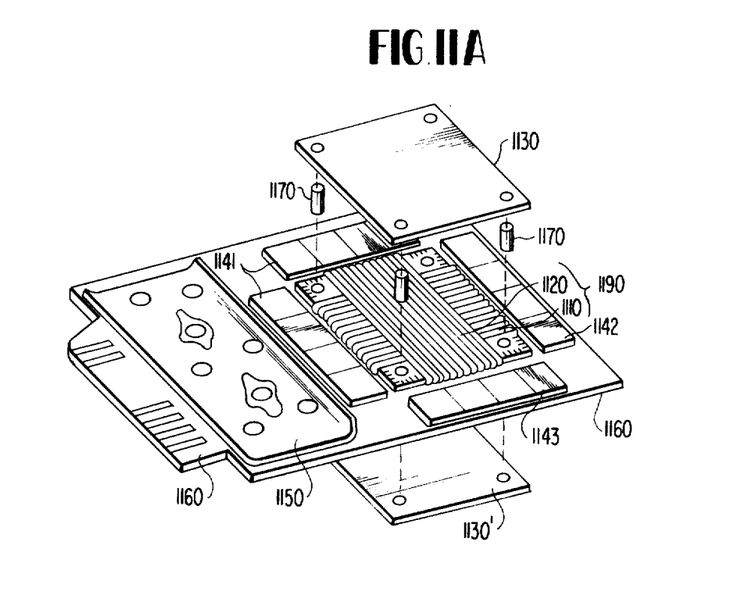
FIG. 11A shows a view of the present equipment embodying the present invention.
Figure 11B:
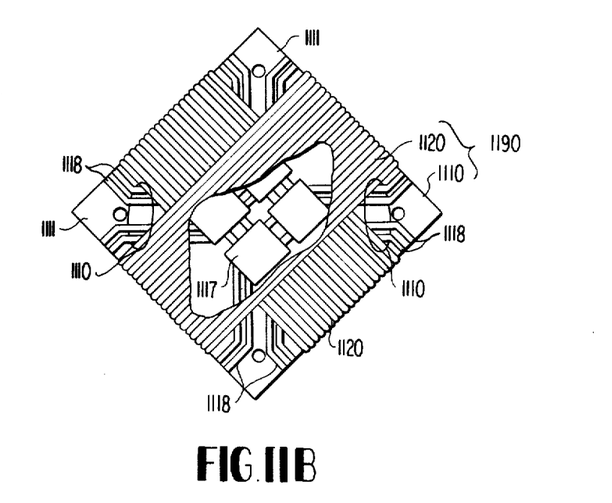
FIG. 11B shows an enlarged view of a part of FIG. 11A.

In FIGS. 11A and 11B, the permalloy thin film patterns constituting the logic circuit of FIG. 9 are arranged on a bubble chip 1117. The chip 1117 is placed on a printed substrate 1110 of a ceramic or the like. A drive coil 1120 for the rotating magnetic field is wound around the substrate 1110. A detecting line 1118 for the magnetic bubbles as well as a terminal of a control current drive line for generating the bubbles are led from terminal output areas 111 devoid of the coil 1120 on the four corners. A plane 1190 thus prepared is attached to a package board 1160 and covered with yokes 1130 and 1130' of ferrite plates from above and below. The upper yoke 1130 and the lower yoke 1130' are magnetized by means of permanent magnet bars 1170 inserted into the four corners. This permits the yokes 1130 and 1130' of ferrite plates to supply the biasing magnetic field to the bubble chip 1117.

Arranged on the package board 1160 other than the plane 1190 are an A.C. (alternating current) drive circuit 1150 for the rotating magnetic field, a control circuit adapted to operate similarly to the external signal generating circuit 810 of FIG. 8, a bubble generating circuit 1143 adapted to cause the generation of the magnetic bubbles as the internal signal pulses, and a detecting circuit 1142 for the bubbles. The realization of the A.C. (alternating current) drive circuit 1150 is not so difficult, if the size of the chip 1117 and the number of the chips 1117 are not considerably large. If the drive frequency of the rotating magnetic field is less than 100 KHz, the size may be rendered compact and the price thereof may be maintained below several tens of dollars.

Now, description will be given of the advantages of the present invention. Firstly, it is assumed that (m) is the number of the sequential logic (standard symbol string patterns) relating to the recognition ratio, (q) is the number of the symbols used (or features), the (S) is number of state nodes in the state transition diagrams for the respective sequential logics, and (n) is an average length of the input symbol string pattern. In addition, it is assumed that (Tc) is the access time per S bits of a magnetic core memory, and (Ts) is the shift time of one bit of a shift register.

With the use of the magnetic core memory as in the prior art, two bits are required for storing a processing method (i.e., transition, rejection, don't care or end) of an internal signal from the respective state nodes for the respective symbols. So, the storage capacity of 2 mgS bits is required. Also, the comparison of the respective symbol string patterns with all the standard symbol string patterns is performed time-sequentially, the average processing time per n symbols is considered to be mnTc. Assuming that Tc is 1 microsecond, $m=256$ (recognition characters 10), $n=20$, $q=11$, and $S=6$, the capacity will be 33,792 bits, and the processing time will be 5.12 milliseconds. Although the per-bit price of the magnetic core memory is considerably low, it exceeds 5 cents in most cases. Accordingly, if 1700 dollars must be paid for the use of the core memory despite the lower number of the recognition characters, with the result of the processing time of only 5.12 milliseconds, the performance cost ratio may be said to be too low. In addition, the increase of the number of recognition characters in the core memory results in a disadvantage in that the capacity and processing time are increased in proportion thereto. In this case, it is possible that an IC memory, which is of lower cost and higher speed, may be used in place of the core memory. However, there remains possibilities that the processing program of the sequential logic disappears, upon interruption of an electric power and that high reliability can not be maintained.

The equipment of the present invention using a magnetic bubble device requires a space for admitting the arrangement of four X-shaped permalloy thin film patterns for each of the substate nodes of (q+1) in number, which have been decomposed from each state node. As a result, the pattern spaces of 4S(q+1) in number are used for the sequential logic circuit having state nodes of S in number. Thus, the m sequential logic circuits, which include the spaces of the external shift registers, require the use of the pattern spaces of 4 mS (q+2). Assuming that the density of patterns arranged is 10 5/5 ×5 mm (size), about $8 \times 10^4$ pattern spaces in case $q=11$, $S=6$, and $m=256$ will be housed in one chip of 5 × 5 mm (in size). It is estimated that a package of the chip as shown in FIG. 11A may be available at the cost of less than several tens of dollars. Moreover, the average step number per n symbols in FIG. 9 is n (q + 2)/3) as has been estimated with reference to FIG. 7. The step number in the external shift register is equal to the number m of the sequential logics. The average shifting time for one step of bubbles depends on the supply time of the drive magnetic field of FIG. 10, and thus the average shifting time of 10 microseconds is possible from technical viewpoints. Consequently, the processing time per n symbols is (n (q + 2)/3) + m) × 10 microseconds. Thus, in case $m = 256$, $n = 20$, and $q = 11$, the processing time per 20 symbols in the present invention will be obtained as being 2.43 milliseconds.

Therefore, comparing with the case of the core memory, the price is lowered to less than 1/50 and the processing time is reduced to about ¼. In addition to this, even if the number of characters to be recognized and the recognition ratio thereof in the case of the present invention are increased by increasing the number (m) of the sequential logics (i.e., by increasing the number of chips), the increase in the processing time may be suppressed by using the detecting circuit adapted to operate in parallel. Also, since the price is only increased corresponding to the number of the chips, the difference of the cost performance between the prior-art equipment using the core memory and the present equipment will be increased further with an increase in m. As is apparent from the foregoing estimation, the following advantages of the present invention may be well recognized:

1. Since the same processing speed may be readily attained even by using a low speed shift register in place of a high speed random access memory, the cost of the equipment may be reduced relatively.

2. A high processing speed may be attained, even if the number of the sequential logics (standard symbol string patterns) is increased so as to increase the number of characters to be recognized and their recognition ratio.

3. The use of a magnetic bubble device capable of having both functions of logic and memory for the present equipment may noticeably reduce the size of the equipment as well as its price. Accordingly, the present invention avoids the shortcomings experienced with the prior art equipment in that an ordinary attempt to increase the processing speed results in an increase in the cost of the equipment.

In the above-mentioned embodiments, description has been directed to the equipment using the magnetic bubble device. However, the semi-conductor IC may be applied to the equipment of the present invention. In other words, an AND gate may be used in the coupling element, and the function may be determined depending on where the output terminal of the AND gate is connected to. In general, in case the semi-conductor IC or LSI is used for the equipment of the present invention, greater advantages are achieved in the reduction of the processing time rather than in the reduction of cost. If the processing drive speed of the device is low, by the use of the semi-conductor which reduces the cost, the same advantages as those obtained in the case of magnetic bubble device will be achieved.

Also, it has been considered that in the present invention, once the sequential logic is determined, there will be no change therein. However, in the practical application, such a change is required once a year. In this case, the cost for such a change in the magnetic bubble device is appreciably low as compared with the cost of the mask pattern change in the semi-conductor whose manufacturing process is considerably complicated.

The first embodiment of the present invention as shown in FIG. 5A is better adapted to be constructed by the semi-conductor rather than by the magnetic bubble device. In this case, if the function of the coupling element is so designed as to be changed per cycle of the internal signal pulse, the number of stages of the internal shift registers can be reduced. When the function is so changed as to return to its initial condition in two cycles, the number of the stages of the shift registers can be reduced by half. Also, if the function is returned to its initial condition at l cycles, the number of the stages can be reduced to 1/l.

In the second embodiment of the present invention as shown in FIG. 8, the lengths of the external signal strings corresponding to the respective symbols were encoded to be minimized, though the internal signal pulses go up and down irregularly in the internal shift registers of the respective sequential logic circuits. However, it is possible to correlate each symbol the external signal string so as to insure returning of the internal signal pulse to a specific position of the internal shift register, according to the application of the respective symbols. In this case, the processing time may be extended to some extent, but an advantage of easy design of the permalloy thin film patterns is obtained. For instance, for returning the internal signal pulse to the intermediate third stage of the internal shift register, it is necessary that external signal strings C'λ T'CC, T'C'CC, TCC'C', C'TC'C' should correspond to symbols $\overline{A}$, $\overline{B}$, $\overline{C}$, $\overline{D}$. The design of such an external signal generating circuit may be selected optionally.

We claim:

1. A symbol string pattern recognition equipment comprising:
   an external signal generating circuit for generating respective input symbols constituting a symbol string pattern in the form of a string of binary-coded external signals;
   at least one internal signal generating circuit for generating an internal signal in response to the symbol string pattern;
   a plurality of sequential logic circuits connected to said internal signal generating circuit and controlling travelling paths of the internal signal depending on the external signal, each of said sequential logic circuits consisting of a parallel arrangement of internal shift registers having a plurality of stages adapted to circulate or move the internal signal in either of two directions within the internal shift registers in synchronism with the external signals, and coupling elements coupled between shift registers and between selected stages of shift registers, said coupling elements having a function of shifting the internal signal or erasing the internal signal in the course of shifting or returning the internal signal to an internal shift register, when receiving one of the binary-coded external signals, and said coupling elements having another function of returning the internal signal to the first of said parallel arrangement of said internal shift registers all the time, when receiving the other of the binary-coded external signals;
   an external shift register connected to each of the sequential logic circuits; and
   a detecting circuit for checking whether or not the internal signal has reached the external shift register, upon completion of the supply of the symbol string pattern.

2. A symbol string pattern recognition equipment as claimed in claim 1 wherein each shift register corresponds to a mode of the sequential logic and each shift register stage comprises a storage element and corresponds to a substate node in the sequential logic, and wherein said coupling elements comprise at least a positive coupling element receiving as inputs an internal signal and the output of said external signal generating circuit and providing as outputs said internal signal to a stage in an adjacent shift register in the presence of an external signal or said internal signal to an adjacent stage within the shift register in the absence of an external signal, and a negative coupling element receiving as inputs an internal signal and the output of said external signal generating circuit and providing as an output said internal signal to an adjacent stage within the shift register only in the absence of an external signal.

3. A symbol string pattern recognition equipment as claimed in claim 2 wherein said sequential logic circuits are constructed as a magnetic bubble domain device comprising:
   a sheet of magnetic material capable of retaining magnetic bubble domains;
   means for applying a biasing magnetic field normal to said sheet;
   first means responsive to said external signal generating circuit for generating in-plane magnetic fields parallel with the surface of said sheet;
   second means responsive to said at least one internal signal generating circuit for generating a bubble domain in the surface of said sheet; and
   a plurality of x-shaped ferromagnetic pieces disposed adjacent said sheet, said ferromagnetic pieces being responsive to said in-plane magnetic fields and arranged in predetermined sequential logic patterns to form a plurality of propagation paths for bubble domains.

4. A symbol string pattern recognition equipment as claimed in claim 1 wherein said external signal generating circuit comprises:
   register means for receiving an input symbol in the form of a binary code;
   a source of clock pulses;
   an up-down counter responsive to said source of clock pulses for counting up or down; the output of said counter representing the position of the internal signal means for comparing the contents of said register means with the output of said up-down counter and generating a coincidence pulse when the contents of said register means coincides with the output of said counter; and drive means responsive to said coincidence pulse for generating said external signals.

* * * * *

UNITED STATES PATENT AND TRADEMARK OFFICE
CERTIFICATE OF CORRECTION

PATENT NO. : 4,003,022                    Page 1 of 2

DATED : January 11, 1977

INVENTOR(S) : Kousuke Takahashi; Haruki Kohara

It is certified that error appears in the above—identified patent and that said Letters Patent are hereby corrected as shown below:

IN THE SPECIFICATION

Column 1, line 67 - after "logics of" insert -- a --

Column 8, lines 26-28 - Arrow omitted either at end or beginning of lines.
          lines 33-36 - Arrow omitted either at end or beginning of lines.
          line 41 - after "/3" delete ")"

Column 9, line 68 - delete "porality" and insert -- polarity --

Column 10, line 4 - delete "porality" and insert -- polarity --
           line 4 - delete "O" (letter) and insert --0-- (numeral)
           line 6 - delete porality" and insert -- polarity --
           line 51 - delete "magnets-" and insert --magneto- --
           line 59 - delete "pemalloy" and insert -- permalloy --
           line 60 - delete "patters" and insert -- patterns --

Column 11, line 16 - delete "pattern" and insert -- patterns--
           line 18 - delete "194" and insert --914 --
           line 43 - after "mentioned" delete the comma Column 12, line 16 - delete "i" and insert -- if --

Column 13, line 38 - before "number" insert -- the --
           line 49 - "mgS" should be --mqS--

UNITED STATES PATENT AND TRADEMARK OFFICE
CERTIFICATE OF CORRECTION

PATENT NO. : 4,003,022
DATED : January 11, 1977
INVENTOR(S) : Kousuke Takahashi; Haruki Kohara It is certified that error appears in the above-identified patent and that said Letters Patent are hereby corrected as shown below:

IN THE SPECIFICATION (Cont.)

Column 14, line 29 - delete "3)" and insert -- 3 --
                line 35 - delete "1/4" and insert -- 1/2 --
                line 65 - delete "ordinary"
                line 66 - after "speed" insert "--ordinarily --

Column 15, line 13 - after "of" insert -- the --
                line 40 - after "symbol" insert -- with --
                line 49 - delete "\"

IN THE CLAIMS

Column 16, line 66 - delete semi-colon and insert comma
                line 68 - after "signal" insert -- ; --

Signed and Sealed this

Fourteenth Day of June 1977

[SEAL]

Attest:

RUTH C. MASON
*Attesting Officer*

C. MARSHALL DANN
*Commissioner of Patents and Trademarks*